Inventors
ALFRED KASTLER
MAURICE ARDITI
By Philip M. Bolton
Attorney

Sept. 11, 1962 A. KASTLER ETAL 3,054,069

FREQUENCY SELECTION SYSTEM UTILIZING A PLURALITY OF TRANSITIONS

Filed April 29, 1958 2 Sheets-Sheet 2

Inventors
ALFRED KASTLER
MAURICE ARDITI
By Philip M. Bolton
Attorney

United States Patent Office 3,054,069
Patented Sept. 11, 1962

3,054,069

FREQUENCY SELECTION SYSTEM UTILIZING A PLURALITY OF TRANSITIONS

Alfred Kastler, Paris, France, and Maurice Arditi, Clifton, N.J., assignors to International Telephone and Telegraph Corporation, Nutley, N.J., a corporation of Maryland Filed Apr. 29, 1958, Ser. No. 736,431
(Filed under Rule 47(a) and 35 U.S.C. 116)
15 Claims. (Cl. 331—3)

This invention relates to a frequency selective method and system using simultaneous detection of a plurality of microwave hyperfine transitions in the ground state of an alkali metal vapor, and particularly the application thereof in an atomic frequency standard.

It has been proposed to use the frequency selective atomic transitions in a gas cell as a control for an oscillator to thereby provide a frequency standard. Devices of this type have been termed "atomic clocks."

In one possible form of a gas cell atomic clock, an oscillator induces a transition in a molecular or atomic state. This transition has a certain frequency sensitivity (resonance curve). By phase modulation of the oscillator, the derivative of the resonance curve (S curve) can be obtained at the output of a phase detector. This S curve provides an error signal which can be fed back to lock the oscillator to the frequency of the atomic transition.

In such a system the requirements for a stable and accurate clock are as follows:

*a.* The signal-to-noise (S/N) ratio of the detector should be as large as possible.

*b.* The width of the resonance curve should be as narrow as possible.

*c.* The center frequency $f_0$ should be nearly independent of external electric or magnetic fields, temperature variations, pressure, acceleration, etc.

*d.* No system errors should be introduced by the automatic frequency control.

One atomic transition which quite nearly answers these specifications is the microwave hyperfine transition $\Delta F=1$ $\Delta m_F=0$ $m_F=0$ at ground state in alkali metal vapors. This transition is based on the relative orientation of the spin of the valence electron as compared to the spin of the nucleus. However, the sensitivity of the detection of this transition in an atomic clock would be very low. The prime reason for this, as pointed out in the copending U.S. application of M. Arditi and T. R. Carver for "Frequency Selective Method and System," filed December 10, 1957, Serial No. 701,929, is that the population difference between the lower and higher energy levels between which this transition occurs is small. In said application the use of optical pumping with circularly polarized light has been suggested to produce an increase or "pileup" of population in specific energy levels. These levels correspond to the largest absolute values of the magnetic momentum of the hyperfine energy levels in the ground state of the alkali metal vapor. For example, in sodium these would be $F=2$ $m_F=+2$ and $F=2$ $m_F=-2$, while in cesium these would be $F=4$ $m_F=+4$ and $F=4$ $m_F=-4$. Corresponding levels are found in the vapor of other alkali metals. However, due to the fact that with hyperfine transitions from and to these levels the center of the frequency selective characteristic of the atomic transition varies substantially with variations in the magnetic field strength, the use of these transitions for an atomic clock has been neglected, despite the fact that because of the high population pileup a large signal-to-noise ratio could be obtained with them at the output of the detector, particularly when detecting the variations of the light output from the gas cell. Instead, in the aforementioned application it is proposed to use the same optical pumping but with a transition ($\Delta F=1$ $\Delta m_F=0$ $m_F=0$) which is relatively independent of the magnetic field and to depend for an increase of the signal-to-noise ratio on a secondary effect in which the aforementioned population pileup is used when detecting the $\Delta F=1$ $\Delta m_F=0$ $m_F=0$ transition.

An object of the present invention is the provision of an improved frequency selective method and system making use of those microwave hyperfine transitions in the ground state of an alkali metal vapor, the center frequency of whose characteristics vary with variations in the magnetic field, but in such a way as to provide a substantially constant frequency output whose frequency is substantially unaffected by said variations in the magnetic field.

Another object of the present invention is the provision of an improved atomic clock system using optical pumping, for example, with polarized light, to produce population increases at the energy levels corresponding to the largest absolute values of the magnetic momentum of the hyperfine energy levels in the ground state of an alkali metal vapor and producing transitions involving said levels to provide frequency selective characteristics to control the output frequency of the clock, the output frequency of the clock being relatively insensitive to changes in the magnetic field strength.

As has been pointed out before, optical pumping, especially with circularly polarized light produces a population pileup at levels corresponding to the largest absolute values of the magnetic momentum of hyperfine energy levels in the ground state of the alkali metal vapor. Depending upon whether the circularly polarized light is right circularly polarized or left circularly polarized, pileups will be produced at the level of largest positive or largest negative value of the magnetic momentum. For example, in sodium this largest positive level would be $F=2$ $m_F=+2$, while the negative would be $F=2$ $m_F=-2$. As will be more fully pointed out hereinafter, the center of the frequency selective characteristic of transitions involving said positive level ($m_F=+2$) and the center of the frequency selective characteristic of transitions involving said negative level ($m_F=-2$) both vary substantially linearly with changes in the magnetic field over a relatively wide range. They vary symmetrically, but, however, in opposite directions. Accordingly, as the magnetic field intensity increases, the center frequency of the frequency selective characteristic of one of these transitions will increase in frequency, while that of the other will decrease by the same amount, and vice versa. It is not feasible to maintain the magnetic field strength in which a volume of alkali metal vapor is immersed sufficiently constant to prevent frequency changes of a substantial magnitude in the center frequency of these transitions. It is, however, feasible to maintain a relatively uniform magnetic field in an area in which a plurality of such transition can occur. Therefore, in accordance with the main feature of the present invention a medium of alkali metal vapor in a relatively homogeneous magnetic field is simultaneously excited to produce different transitions whose center frequencies vary symmetrically but oppositely with changes in the magnetic field intensity, and these transitions together are used to produce an output frequency that is substantially independent of changes in the magnetic field strength in which these transitions occur.

In accordance with another feature of the present invention, optical pumping, especially by right and left circularly polarized light, is used to produce population pipeups at the largest positive and negative value of the magnetic momentum of the hyperfine ground energy levels of an alkali metal vapor in a relatively homogeneous magnetic field, and microwave transitions involving said levels are induced, these transitions being used to maintain the output frequency substantially constant despite variations in the magnetic field strength permeating said vapor.

In accordance with another feature of the present invention, different transitions, in the microwave hyperfine ground energy levels of an alkali metal vapor, varying symmetrically and in opposite directions with changes in the magnetic field strength are used to control separate oscillators, the frequency of these oscillators being combined to provide an atomic clock standard. As the magnetic field intensity varies, the oscillator controlled through one of these transitions will be raised in frequency, while the oscillator controlled through the other transition will be lowered by an equal amount. Thus, the net change in the combined frequencies of both oscillators is zero. This fact is used to produce a constant frequency source, for example, by adding the frequencies from each oscillator, for the sum of their frequencies will also remain constant.

In accordance with another feature of the present invention, the above-mentioned medium of alkali metal vapor consists of different volumes or portions thereof in a magnetic field that is relatively uniform for the two volumes, although the strength of the field may vary. One of these volumes is optically pumped by right circularly polarized light and another by left circularly polarized light to produce population pileups at different hyperfine energy levels, and two kinds of microwave transitions $\Delta F=1$ $\Delta m_F=+1$ $\Delta F=1$ $\Delta m_F=-1$ are induced, one kind only, in each of said volumes, the resultant light changes being detected optically or by microwave detectors and used to control different oscillators. The frequencies of these oscillators are combined to produce an atomic clock standard.

In a still further feature of the present invention, the above-mentioned different volumes consist of separate cells placed in a substantially uniform, though not necessarily constant magnetic field.

Other and further objects of the present invention will become apparent, and the foregoing will be better understood with reference to the following description of an embodiment thereof, reference being had to the drawings, in which.

To facilitate understanding of the present invention, there is next presented a brief discussion of the energy levels in the ground state of alkali metal vapors and variations of the center frequency of the frequency selective characteristics of transitions involving these levels with changes in the strength of the magnetic field in which these transitions occur. This discussion is principally directed to the energy levels and transitions of sodium 23, but its application to the other alkali metal vapors will be apparent.

Figure 1:
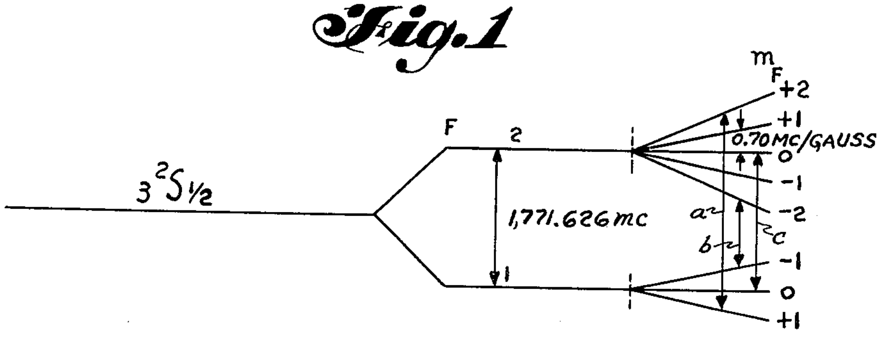
FIG. 1 is an energy level diagram of the ground state of sodium 23 showing the Zeeman splitting thereof.

Referring now to FIG. 1, which schematically indicates the ground energy levels of sodium 23, it will be seen that this energy level is split into two hyperfine levels $F=2$ and $F=1$, which are subject to Zeeman splitting into Zeeman sub-levels under the influence of a weak magnetic field. As shown in FIG. 1, the hyperfine level $F=2$ is split into five Zeeman sub-levels, while the hyperfine level $F=1$ is split into three Zeeman sub-levels. Transitions between the Zeeman sub-levels will be produced by proper excitation. Transitions between these sub-levels are governed by the selection rules for magnetic dipole radiation:

$$\Delta F=0,\ \pm 1 \quad \Delta m_F=0,\ \pm 1$$

where $m_F$ is the magnetic quantum number used to distinguish said sub-levels. The particular transitions that are of principal interest here are those involving $\Delta F=1$ since the transitions $\Delta F=0$ correspond to relatively lower frequencies and thus are of lesser interest where high accuracy, such as for an atomic clock, is desired. More specifically, the transitions in alkali metal vapors of major interest for the embodiment of the present invention hereindescribed are the transitions $\Delta F=1$ $\Delta m_F=\pm 1$. In the case of sodium these transitions would be from $F=2$ $m_F=+2$ to $F=1$ $m_F=+1$; and $F=2$ $m_F=-2$ to $F=1$ $m_F=-1$. These two transitions are indicated by the letters *a* and *b*, respectively, in FIG. 1. The reason for selecting these transitions is that by utilizing optical pumping, for example by circularly polarized light, a greater signal-to-noise ratio is obtainable in detecting these transitions than, for example, would be obtained by detecting the $\Delta F=1$ $\Delta m_F=0$ transitions (for sodium 23, this is indicated by line C in FIGS. 1 and 2), while at the same time by utilizing the techniques of the present invention, the sensitivity of these transitions to variations in the magnetic field strength is prevented from affecting the center frequency stability of the output of the system.

The effect of optically pumping an alkali metal vapor with right and left circularly polarized light is to raise the energy level of the atoms to an excited state from which they fall back to the ground state level producing a population increase principally in the largest absolute values of the magnetic momentum of the hyperfine energy levels. Thus, there would be an increase in the population pileup (FIG. 1) at $F=2$ $m_F=+2$ and at $F=2$ $m_F=-2$ in sodium 23. If the optical pumping is done with right circularly polarized light then the pileup would tend to occur at one of the foregoing levels, for example, $m_F=+2$, and if the light is left circularly polarized then the pileup would occur at the other of said levels $m_F=-2$. By right circularly polarized light as used herein, the direction of polarization is the same as the direction of the magnetizing current producing the static magnetic field $H_0$ parallel to the direction of propagation of the light. Left circularly polarized light is opposite the direction to said magnetizing current. Unpolarized light which may be thought of as a random mixture of equal numbers of two kinds of photons, one left and one right circularly polarized would produce pileups at both levels. In cesium the pileup would occur principally at $F=4$ $m_F=+4$ and $F=4$ $m_F=-4$. A similar pileup would occur for the other alkali metal vapors, it being a general observation that the more hyperfine ground energy levels there are, the greater the tendency for the atoms in an excited state to distribute their energy pileups over a greater number of said hyperfine levels. However, the largest pileup tends to be at the highest absolute values of the hyperfine ground energy level. When transitions are excited from these levels at which there is a population pileup, the resulting transitions produce a larger signal-to-noise ratio when detected.

Figure 2:
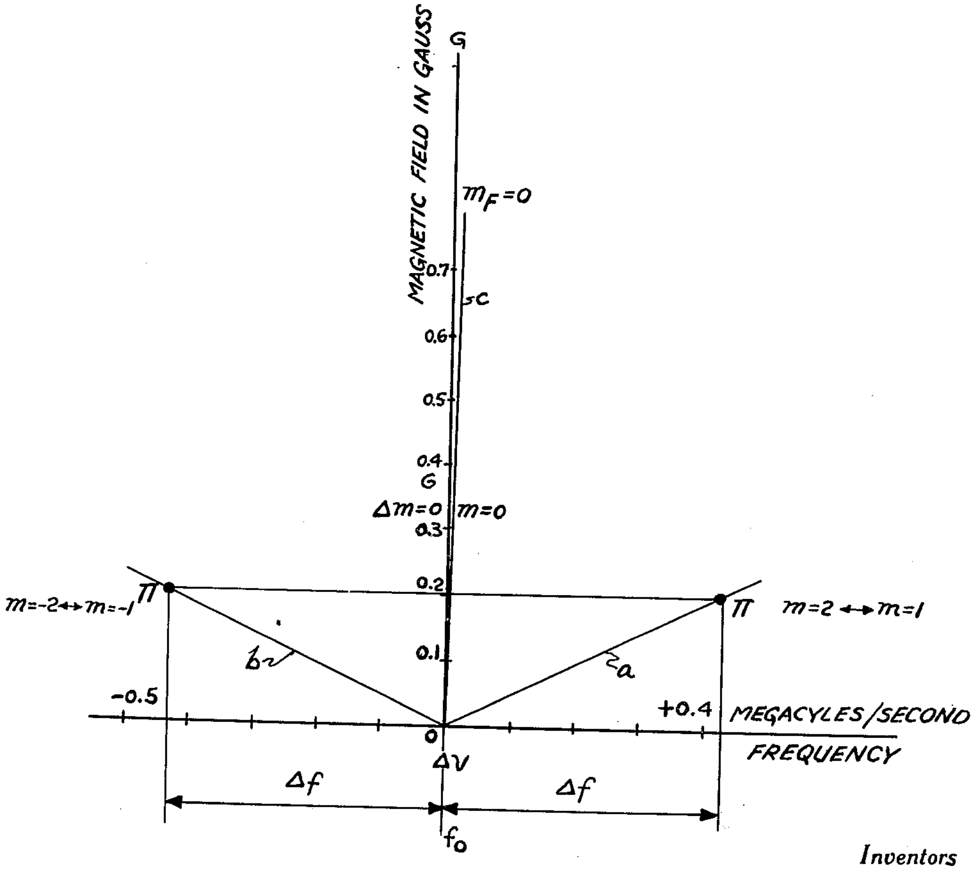
FIG. 2 is a diagram showing changes of frequency with changes of magnetic field strength for three microwave hyperfine ground energy level transitions in sodium 23.
Figure 3:
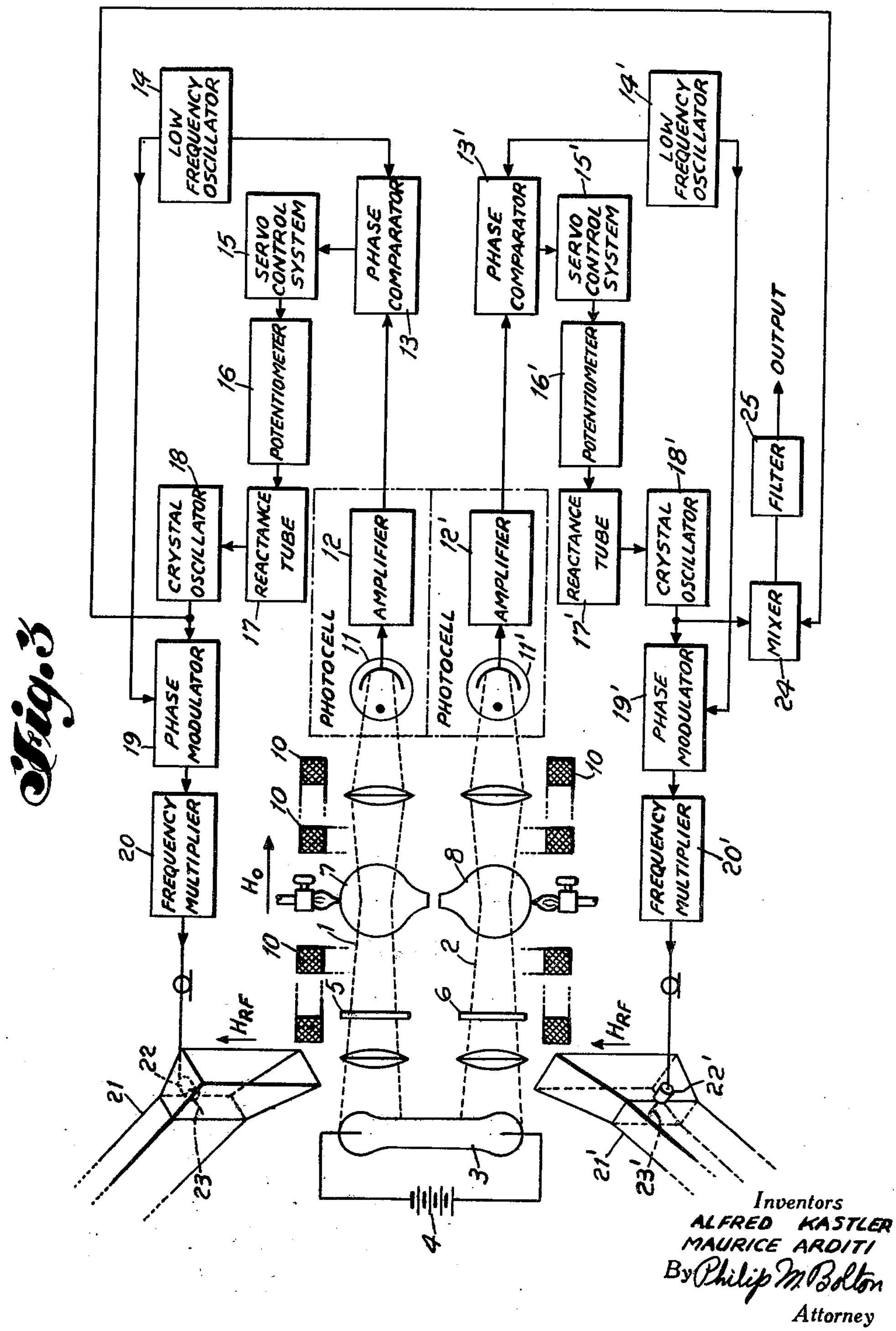
FIG. 3 is a schematic and block diagram of an atomic clock arrangement according to the present invention.

There is, however, a problem involved in the use of such transitions. This can be best seen by an examination of FIG. 2 which illustrates the effect of a change in the magnetic field upon the center frequency of the frequency selective characteristic of these transitions (in sodium 23). The transitions designated by the letters *a* and *b* of FIG. 1 are similarly designated in FIG. 2. The magnetic field strength is plotted along the ordinate, while frequency is plotted along the abscissa. The center frequency at a zero magnetic field for the $\Delta F=1$ $\Delta m_F=1$ (sodium 23) hyperfine ground state transitions is approximately 1771.626+ megacycles per second; as the magnetic field increases, the center frequency of these transitions $a$ and $b$ vary as shown in opposite directions but symmetrically at the rate of 2.1 megacycles per gauss. It is because the center frequency of these transitions $a$ and $b$ shifts with the magnetic field that they have not been looked on favorably for purposes of atomic frequency standards. Instead, as described in the aforementioned application, it has been preferred to use the transition $\Delta F=1\ \Delta m_F=0$ (see $c$, FIGS. 1 and 2). It will be seen that the center frequency of this transition is relatively insensitive to changes in the magnetic field strength. However, in detecting this transition, the signal-to-noise ratio obtained is relatively small as compared with the transitions $a$ and $b$ and therefore, in the present invention it is proposed to use the frequency-selective characteristics of the transitions $a$ and $b$, or their counterparts in the other alkali metals, for example, for an atomic clock. One preferred embodiment of such a clock is illustrated in FIG. 3. However, before going into a discussion of FIG. 3, it may be well to point out at this time that FIGS. 1 and 2 are not intended to be quantitatively exact and are used for illustrative purposes, these figures being intentionally exaggerated and distorted to make the present invention more easily understandable.

In the embodiment illustrated in FIG. 3, two gas cells are arranged in a substantially uniform static magnetic field, the two cells being optically pumped by right and left circularly polarized resonance light of the same alkali metal vapor as is contained in the cells. Transitions in each of these cells are produced by microwave energy directed therethrough whose R.F. field is at right angles to the static magnetic field and is likewise perpendicular to the direction of propagation of the light through said cells. The frequency of this microwave energy is determined for each cell by a separate crystal oscillator, the frequencies of which oscillators are, in turn, controlled by signals resulting from the detection of the transitions within said cells. In the illustrated embodiment, optical detection is used with a suitable automatic frequency control system.

Referring now specifically to the embodiment illustrated in FIG. 3, two steady beams of circularly polarized resonant radiation 1 and 2 are obtained from a standard sodium lamp 3, preferably energized from a steady direct current energy source 4, whose light output is divided into two beams and directed through separate circular polarizers 5 and 6, with 5 producing right circularly polarized light and 6 producing left circularly polarized light so that beams 1 and 2 are of right and left circularly polarized light, respectively. Beams 1 and 2 are directed respectively through gas cells 7 and 8, each containing vaporized sodium 23 and a buffer gas or gases, as will be more fully described hereinafter. The beams produce "optical pumping" in these cells.

Cells 7 and 8 may be prepared in the manner described in the copending application of M. Arditi and T. R. Carver, Serial No. 701,929, filed December 10, 1957, for "Frequency Selective Method and System," and may have a single buffer gas or a plurality of buffer gases therein as described in the copending application of M. Arditi, Serial No. 716,686, filed February 21, 1958, for "Gas Cell for Frequency Selective System," to provide pressure stabilization. The cells are, of course, heated as explained in the above-mentioned applications to a suitable temperature.

Means 9 are provided for establishing a static field $H_0$ permeating both gas cells 7 and 8 having at least a strong component parallel to the direction of propagation of the beams 1 and 2 into the gas cells 7 and 8. The means 9 for establishing a static magnetic field are preferably such as to provide as uniform a field as possible permeating both cells. It must be remembered that for the present purpose it is unnecessary that the magnetic field permeating both cells be constant, but merely that this magnetic field should be as nearly uniform as possible throughout the areas where the different transitions occur and in this specific example in cells 7 and 8. Various methods of achieving such uniformity may be employed. Obviously, one of the best techniques is to remove the cells from any magnetic field gradient or disturbances. For creating such a relatively weak magnetic field of relatively uniform characteristics, the means 9 may include two pairs at right angles of Helmholtz coils 10 surrounding said cells 7 and 8 and spaced apart a distance equal to their radius and carrying the same current. To further increase uniformity, it may be found empirically that the use of shields may be desirable. Alternatively, or in addition to the Helmholtz coils, in order to correct field distortions it may be desirable to use suitably shaped permanent magnets for this purpose.

Since the apparatus for exciting transitions and detecting transitions in cells 7 and 8 is substantially the same and since the associated circuitry involved for each of said cells is substantially the same, this description will be shortened by discussing the arrangement of cell 7, the corresponding components with respect to cell 8 being designated by a prime notation. To detect the transitions from cell 7, it is preferred to arrange a photocell 11 in line with the beam 1 so that the light passing from beam 1 through cell 7 impinges thereon. The output of photocell 11 is amplified in an amplifier 12 and applied to a phase comparator 13 which may be in the form of a synchronous detector. In the phase comparator 13 the output of amplifier 12 is compared with the reference signal from a low frequency oscillator 14, and its output, whose amplitude and polarity varies in accordance with the difference between the center frequency of the atomic transition and the frequency of the microwave energy applied to the cell, as will be pointed out below, is applied to a conventional servo control system 15 which rotates a potentiometer 16 applying voltage to a reactance tube 17 which, in turn, causes relatively small changes in a crystal oscillator 18 to vary its output frequency. The output of crystal oscillator 18 is passed through a phase modulator 19 to which phase modulator a signal from the low frequency oscillator 14 is also applied to thereby phase modulate the output of crystal oscillator 18. This resultant phase modulated signal is applied to frequency multiplier 20 where it is multiplied up to the microwave frequency range, as will be more specifically pointed out hereinafter, to provide a frequency modulated microwave signal. This frequency modulated microwave signal is then applied to a microwave horn 21 via a suitable waveguiding means such as a coaxial line 22 and an exciting probe 23. The horn 21 radiates microwave energy through the cell 7. The probe 23 and the horn 21 are so oriented that the resultant magnetic field of the radiated wave as it passes through the cell 7 is perpendicular to the direction of propagation of the light into cell 7 and is perpendicular to the static magnetic field $H_0$.

A similar arrangement to that hereinabove described with respect to cell 7 is provided in connection with cell 8.

To provide an output that will serve as a frequency standard from the aforedescribed system, the frequency of the signals from crystal oscillator 18 and crystal oscillator 18' or from frequency multiplier 20 and frequency multiplier 20' are added together. In the system illustrated in FIG. 3 the signals from oscillators 18 and 18' are fed to a mixer 24 whose selected output is the sum frequency of the two input frequencies. This selection may be accomplished with a simple bandpass filter 25. This output is the desired frequency standard. For example, in using sodium vapor cells, the crystal oscillators each may be tuned to a frequency of approximately 1 megacycle, and the frequency multipliers 20 and 20' each have a multiplication factor of 1800 times the input frequency. By slight variations in the frequency of the two crystal oscillators 18 and 18′, the resultant output from mixer 24 may be stabilized at a stable frequency near $$\frac{1771.626\times 2}{1800}=1.96847 \text{ mc.}$$

The system just described operates as follows. The excitation by the right circularly polarized light produces in cell 7 a population pileup at the $m_F=+2$ ground energy level, while the left circularly polarized light produces a population pileup at the $m_F=-2$ level in cell 8. Different transitions each involving a separate one of these two population pileups are brought about by adjusting the frequency of the microwave energy radiated from horns 21 and 21′ to match the center frequency of the frequency selective characteristic of each of the transitions designated by *a* and *b* in FIGS. 1 and 2. This adjustment to the proper frequency may be automatically controlled by any suitable AFC system, one such system being illustrated in FIG. 3. This employs the fact that as the microwave frequency applied to either cell is varied on either side of the center of the resonance transition frequency, the light absorption varies according to a characteristic absorption curve having the same shape as a Lorentzian resonance curve. Considering for the moment only a single cell, say cell 7 and its associated circuitry, the low frequency oscillator 14 is used to vary the microwave frequency back and forth over a small portion of the frequency selective curve of cell 7 about a mean frequency fixed by the crystal oscillator 18 and its multiplier 20. If this variation occurs symmetrically around a mean frequency which is equal to the center frequency of the transition characteristic, the output will be a minimum. If the mean frequency is on either side of the center frequency, an output will be obtained from photocell 11 in the form of a low frequency wave. When the mean frequency is on one side of said center frequency, the phase of this low frequency wave will be 180 degrees out of phase with the low frequency wave produced when the mean frequency is on the other side of the center frequency. In the phase comparator 13 the low frequency wave is compared with the reference low frequency wave from low frequency oscillator 14. A D.C. error voltage signal is obtained from the phase comparator 13 whose polarity depends upon the relative phases of the compared low frequency waves. It will be seen that when properly applied these bipolar error signals will drive crystal oscillator 18 in a direction to cause the microwave energy radiated from horn 21 to be equal to the center frequency of transition "*a*." Of the many ways in which this control may be obtained, the one shown only by way of example in FIG. 3 consists of a conventional servo control system, the error signals being amplified in this system in the usual servo amplifier and used to drive a servo motor, the servo motor, in turn, driving a potentiometer 16 controlling the voltage applied to a reactance tube 17 which, in conventional fashion, may be used to control the relatively stable crystal oscillator 18 to make the required slight variations in its frequency output. This output is then multiplied and provides the mean frequency of the microwaves radiated from horn 21.

A similar arrangement occurs for cell 8 and its assocated circuitry whereby crystal oscillator 18′ is controlled by the frequency selective characteristic of the hyperfine ground energy level transitions in the cell 8, as discussed hereinbefore with respect to cell 7. The frequencies of the two crystal oscillators 18 and 18′ are then added together by mixer 24 and filter 25 and, as has been pointed out, the sum of these frequencies will remain constant, despite changes in the magnetic field strength permeating the alkali vapor medium, that is, both cells 7 and 8.

It will be obvious, of course, that numerous other techniques for applying the error signals from the phase comparators to control the mean frequency may be employed, such as, for example, the double loop frequency stabilization system described in an article entitled "A Frequency Stabilization System for Microwave Gas Dielectric Measurements," by William F. Gabriel in Proceedings of the Institute of Radio Engineers, volume 40, 1952, beginning page 940. It will also be obvious that instead of using the preferred optical detection means, microwave detection might be employed. It is also apparent that while the two transitions have been described as occurring in separate cells, these may also occur in the same cell, for example in different areas thereof.

Another possibility is to excite both transitions in the same volume and to detect by microwave detection means the sum of the frequencies of both transitions. An advantage of this arrangement is that the problem of making a uniform static magnetic field is simplified since both transitions will occur within the same cell and in the same area.

Accordingly, while we have described above the principles of our invention in connection with specific embodiments and modifications, it is to be clearly understood that this description is made only by way of example and not as a limitation to the scope of our invention as set forth in the objects thereof and in the accompanying claims.

We claim:

1. A frequency selective system comprising a medium of alkali metal vapor, means for establishing a static magnetic field permeating said medium, means for exciting said medium to produce therein two different kinds of hyperfine ground energy level transitions, the center frequency of the frequency characteristic of one kind of transitions varying symmetrically with the corresponding center frequency of the other kind of transitions but in an opposite direction, with changes in the magnetic field permeating said medium, means for detecting said transitions, a source of microwave oscillations, and means coupled to said detecting means for controlling the frequency of oscillations from said source in accordance with both said kinds of transitions to stabilize said frequencies despite variations in said magnetic field.

2. A frequency selective system comprising a medium of alkali metal vapor, means for establishing a static magnetic field permeating said medium, a first source of microwave radio frequency energy, a second source of microwave radio frequency energy, means coupled to said first source for applying microwave energy therefrom to excite one kind of hyperfine ground energy level transitions in said medium, means coupled to said second source for applying microwave energy therefrom to excite a second kind of hyperfine ground energy level transitions in said medium, said static magnetic field having a substantial component perpendicular to the microwave magnetic field vector, the center frequency of said first and said second kinds of transitions varying symmetrically and in opposite directions with changes in the magnetic field permeating said medium, means for detecting said transitions, means coupled to said detection means for controlling the frequency of said sources, and means coupled to both said sources for combining the frequency of oscillations controlled by said sources to produce output oscillations of stabilized frequency.

3. A frequency selective system comprising a medium of alkail metal vapor, means for establishing a magnetic field permeating said medium, means for exciting said medium to produce therein hyperfine ground energy level transitions $\Delta F=1$ $\Delta m_F=+1$ and $\Delta F=1$ $\Delta m_F=-1$, where F designates a hyperfine ground energy level state of the alkali metal vapor and $m_F$ designates one of its Zeeman sub-levels, means for detecting said transitions, a source of microwave oscillations and means coupled to said detecting means for stabilizing the frequency of oscillations from said source in accordance with both mentioned transitions.

4. A frequency selective system comprising a medium of alkali metal vapor, means for establishing a static magnetic field permeating said medium, a first source of microwave radio frequency energy, a second source of microwave radio frequency energy, means coupled to said first and second sources for exciting hyperfine ground energy level transitions $\Delta F=+1$ $\Delta m_F=+1$ and $\Delta F=1$ $\Delta m_F=-1$, where F designates a hyperfine ground energy level state of the alkali metal vapor and $m_F$ designates one of its Zeeman sub-levels, said static magnetic field having a substantial component perpendicular to the microwave magnetic field vector, means to detect said transitions, means coupled to said detection means for controlling the frequency of said sources and means for combining the frequencies of energy controlled from both said sources to produce a stable output frequency.

5. A frequency selective system comprising a medium of alkali metal vapor, means for establishing a static magnetic field permeating said medium, means for exciting said medium to produce an increase of population at the largest absolute values of the magnetic momentum of the hyperfine energy levels in the ground state of the alkali metal vapor, a pair of sources of microwave energy, means for applying said microwave energy to said medium to excite said medium to produce therein hyperfine ground energy level transitions $\Delta F=1$ $\Delta m_F=+1$ and $\Delta F=1$ $\Delta m_F=-1$, where F designates a hyperfine ground level state of the alkali metal vapor and $m_F$ designates one of its Zeeman sub-levels, said static magnetic field having a substantial component perpendicular to the microwave magnetic field vector, means for detecting said transitions and producing voltages varying in accordance with the deviation of the frequency of the applied microwave energy from the center frequency of the frequency characteristics of said transitions, and means coupled to both said sources for combining the frequency of oscillations controlled by said sources to produce output oscillations of stabilized frequency.

6. An atomic frequency standard comprising a medium of sodium vapor, means for establishing a static magnetic field permeating said medium, means for exciting a first portion of said medium to produce an increase of population in said first portion at a first given hyperfine ground energy level $F=2$ $m_F=+2$, means for exciting a second portion of said medium to produce an increase of population in said second portion at a second given hyperfine ground energy level $F=2$ $m_F=-2$, where F designates a hyperfine ground energy level state of the alkali metal vapor and $m_F$ designates one of its Zeeman sub-levels, means for exciting said first portion to produce hyperfine transitions from said first given hyperfine ground energy level, means for exciting said second portion to produce hyperfine transitions from said second given hyperfine ground energy level, means for detecting the transitions within each of said portions, a source of microwave oscillations and means coupled to said detecting means for stabilizing the frequency of oscillations from said source in accordance with both said transitions.

7. An atomic frequency standard comprising a medium of cesium vapor, means for establishing a static magnetic field permeating said medium, means for exciting a first portion of said medium to produce an increase of population in said first portion at a first given hyperfine ground energy level $F=4$ $m_F=+4$, means for exciting a second portion of said medium to produce an increase of population in said second portion at a second given hyperfine ground energy level $F=4$ $m_F=-4$, where F designates a hyperfine ground energy level state of the alkali metal vapor and $m_F$ designates one of its Zeeman sub-levels, means for exciting said first portion to produce hyperfine transitions from said first given hyperfine ground energy level, means for exciting said second portion to produce hyperfine transitions from said second given hyperfine ground energy level, means for detecting the transitions within each of said portions, a source of microwave oscillations and means coupled to said detecting means for stabilizing the frequency of oscillations from said source in accordance with both said transitions.

8. An atomic frequency standard according to claim 2, wherein said means coupled to both said sources comprises means for producing output oscillations whose frequency is equal to the sum of the frequencies of both said sources.

9. An atomic frequency standard comprising a medium of alkali metal vapor, means for establishing a substantially homogeneous static magnetic field permeating said medium, means for directing right circularly polarized light through a first portion of said medium to produce an increase of population at a first given hyperfine ground energy level, means for directing left circularly polarized light through a second portion of said medium to produce an increase of population at a second given hyperfine ground energy level, said static magnetic field having a substantial component parallel to the direction of light propagation, means for exciting said first and second portions to produce hyperfine transitions from said ground energy levels, means for detecting the transitions within each of said portions, a source of microwave oscillations, and means coupled to said detecting means for stabilizing the frequency of the oscillations from said source in accordance with the transitions in both portions.

10. An atomic frequency standard comprising a medium of alkali metal vapor, means for establishing a substantially homogeneous static magnetic field permeating said medium, means for directing right circularly polarized light through a first portion of said medium to produce an increase of population at a first given hyperfine ground energy level, means for directing left circularly polarized light through a second portion of said medium to produce an increase of population at a second given hyperfine ground energy level, a first and a second source of microwave oscillations, means for radiating electromagnetic energy from said first microwave source through said first portion to produce hyperfine transitions from said first level, means for radiating microwave energy from said second source through said second portion to produce hyperfine transitions from said second level, the radiated electromagnetic energy having a substantial component of its magnetic field perpendicular to the static magnetic field, said static magnetic field having a substantial component parallel to the direction of propagation of light into said medium, means for detecting the transitions within each of said portions, automatic frequency control means coupled to said detecting means for controlling the frequency of each of said sources, and means coupled to both said sources to produce oscillations whose frequencies are controlled by both said sources.

11. An atomic frequency standard comprising a medium of sodium vapor, means for establishing a static magnetic field permeating said medium, means for directing right circularly polarized light through a first portion of said medium to produce an increase of population in said portion at a first given hyperfine ground energy level $F=2$ $m_F=+2$, where F designates a hyperfine ground energy level state of the alkali metal vapor and $m_F$ designates one of its Zeeman sub-levels, means for directing left circularly polarized light through a second portion of said medium to produce an increase of population in said portion at a second given hyperfine ground energy level $F=2$ $m_F=-2$, said static magnetic field having a substantial component parallel to the direction of light propagation, means for exciting said first portion to produce hyperfine transitions $\Delta F=1$ $\Delta m_F=+1$, means for exciting said second portion to produce hyperfine transitions $\Delta F=1$ $\Delta m_F=-1$, means for detecting the transitions within each of said portions, a source of microwave oscillations, and means coupled to said detecting means for controlling the frequency of the oscillations from said source in accordance with both said transitions.

12. An atomic frequency standard comprising a medium of cesium vapor, means for establishing a static magnetic field permeating said medium, means for directing right circularly polarized light through a first portion of said medium to produce an increase of population in said portion at a first given hyperfine ground energy level $F=4\ m_F=+4$, where F designates a hyperfine ground energy level state of the alkali metal vapor and $m_F$ designates one of its Zeeman sub-levels, means for directing left circularly polarized light through a second portion of said medium to produce an increase of population in said portion at a second given hyperfine ground energy level $F=4\ m_F=-4$, means for exciting said first portion to produce hyperfine transitions $\Delta F=1\ \Delta m_F=+1$, means for exciting said second portion to produce hyperfine transitions $\Delta F=1\ \Delta m_F=-1$, means for detecting the transitions within each of said portions, a source of microwave oscillations, and means coupled to said detecting means for controlling the frequency of the oscillations from said source in accordance with both said transitions.

13. An atomic frequency standard comprising a medium of alkali metal vapor, means for establishing a static magnetic field permeating said medium, means for directing right circularly polarized light through a first portion of said medium to produce an increase of population at a first given hyperfine ground energy level, means for directing left circularly polarized light through a second portion of said medium to produce an increase of population at a second given hyperfine ground energy level, a first and second source of microwave oscillations, means for radiating electromagnetic energy from said first microwave source through said first portion to produce hyperfine transitions from said first level, means for radiating microwave energy from said second source through said second portion to produce hyperfine transitions from said second level, a first optical detection means for detecting light passing through said first portion, a second optical detection means for detecting light passing through said second portion, automatic frequency control means coupled to both said optical detection means for controlling the frequency of each of said sources, and means coupled to both said sources to produce oscillations whose frequency is controlled by both said sources.

14. An atomic frequency standard comprising a pair of cells of alkali metal vapor, means for establishing a homogeneous static magnetic field permeating both said cells, means for directing right circularly polarized light through a first of said cells to produce an increase of population in said first cell at a first given hyperfine ground energy level, means for directing left circularly polarized light through a second of said cells to produce an increase of population in said second cell at a second given hyperfine ground energy level, a first and a second source of microwave oscillations, means for radiating electromagnetic energy from said first microwave source through said first cell, means for radiating microwave energy from said second source through said second cell, the frequency of the oscillations from said first and second cells being such as to produce hyperfine transitions from said first and second ground energy levels respectively, the magnetic field of said electromagnetic wave energy having a substantial component perpendicular to the static magnetic field, the static magnetic field being parallel to the direction of propagation of light into each of said cells, means for detecting the transitions within each of said cells, automatic frequency control means coupled to said detecting means for controlling the frequency of each of said sources, and means coupled to both said sources to produce oscillations whose frequency is controlled by the frequencies of both said sources.

15. A frequency selective system comprising a pair of cells of alkali metal vapor, means for establishing a homogeneous static magnetic field permeating both said cells, means for exciting said cells differently to produce in separate ones of said cells different kinds of hyperfine ground energy level transitions, the center frequency of the frequency characteristic of one kind of transition in one of said cells varying symmetrically with the corresponding center frequency of the other kind of transition in the other cell but in an opposite direction with changes in the strength of the homogeneous magnetic field permeating both said cells, means for detecting said transitions, a source of microwave oscillations, and means coupled to said detecting means for controlling the frequency of oscillations from said source in accordance with both said kinds of transitions to stabilize said frequency despite variations in the strength of said homogeneous magnetic field.

References Cited in the file of this patent

UNITED STATES PATENTS

| | | |
|---|---|---|
| 2,669,659 | Norton | Feb. 16, 1954 |
| 2,836,722 | Dicke et al. | May 27, 1958 |
| 2,884,524 | Dicke | Apr. 28, 1959 |

OTHER REFERENCES

"Spin Resonance of Free Electrons Polarized by Exchange Collisions," by Dehmelt in Physical Review, vol. 109, No. 2, pages 381–385.